Figure 1:
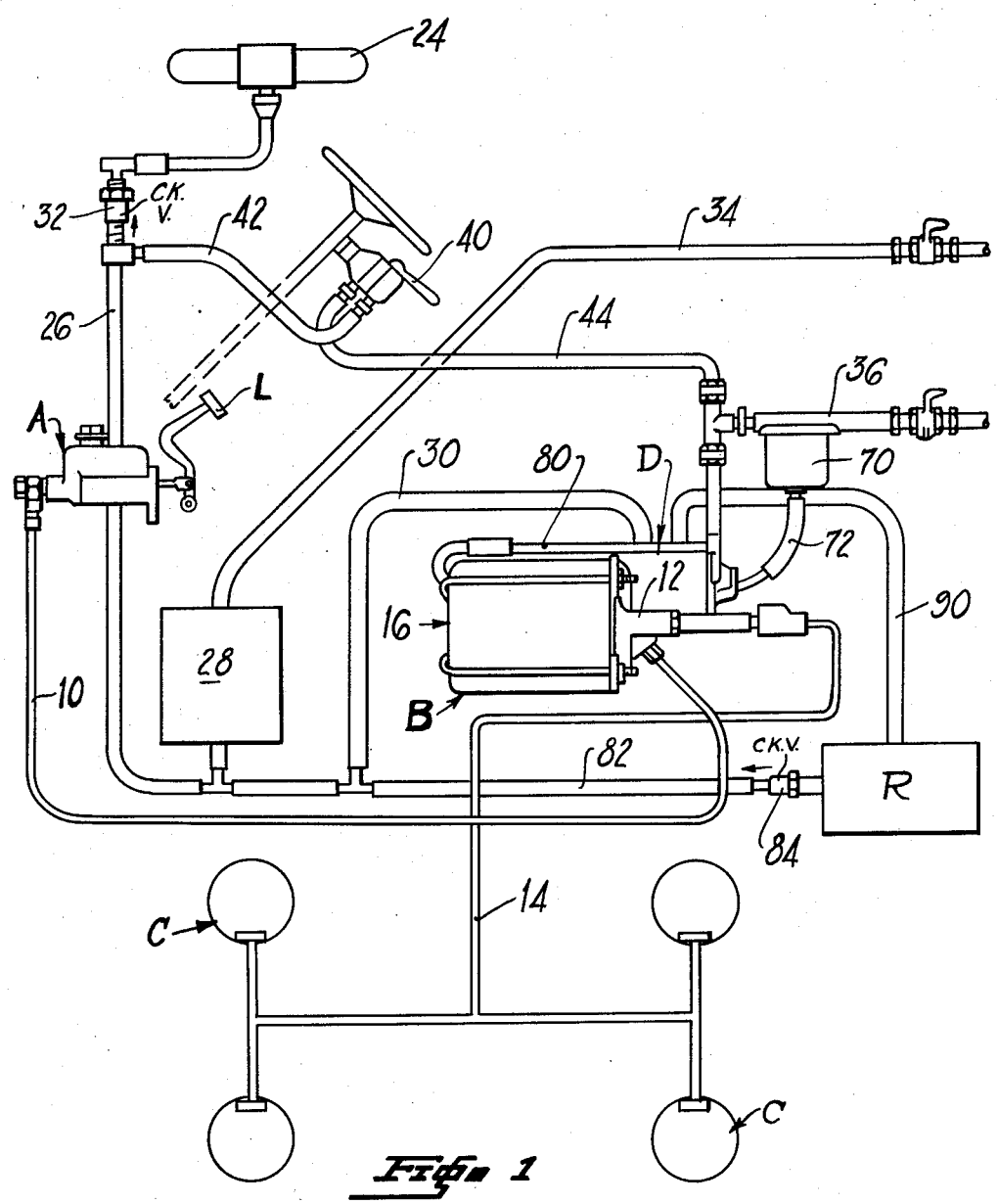

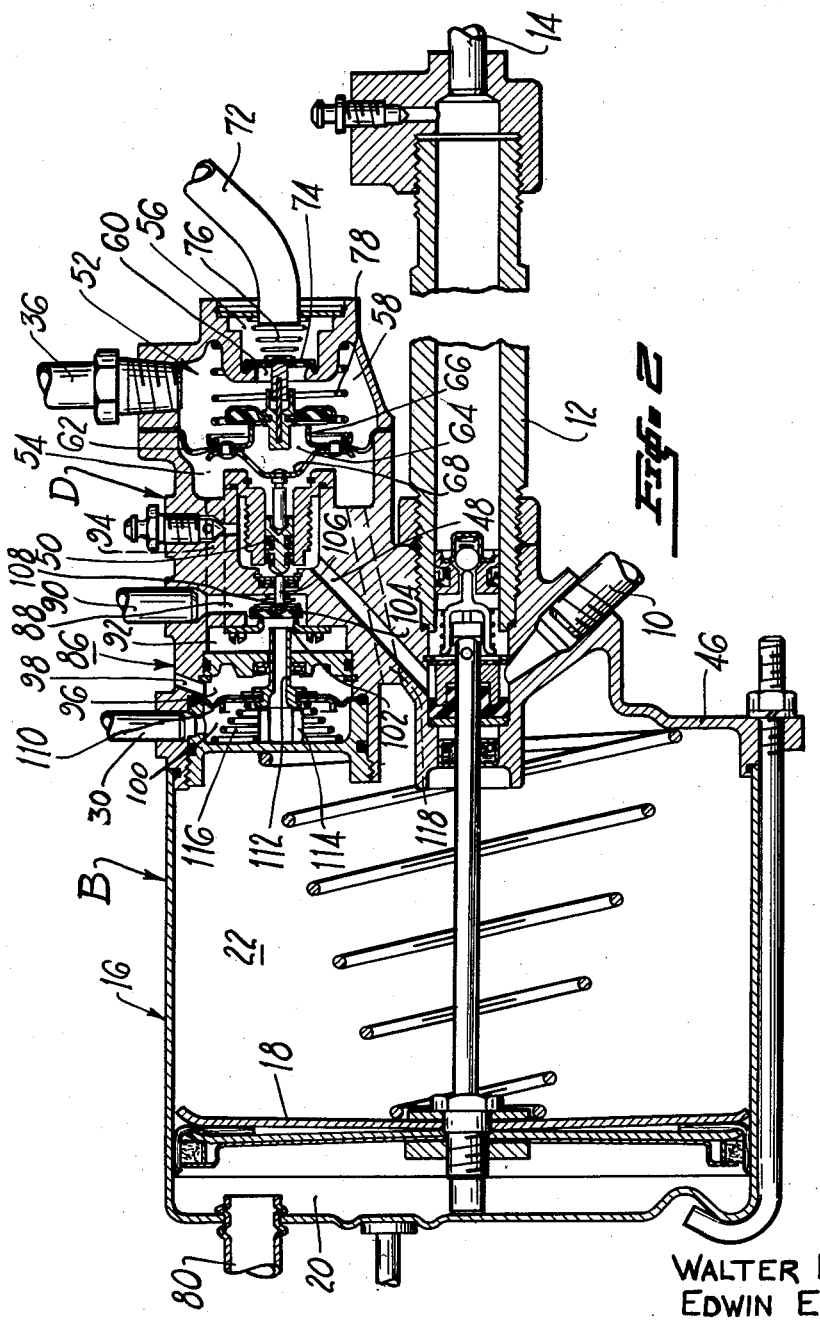

United States Patent Office
2,911,264
Patented Nov. 3, 1959

2,911,264
AUTOMATIC BRAKING DEVICE

Walter E. Schock, Edwin E. Prather, and Earl R. Price, South Bend, Ind., assignors to Bendix Aviation Corporation, South Bend, Ind., a corporation of Delaware Application June 25, 1956, Serial No. 593,449

4 Claims. (Cl. 303—63)

The present invention relates to pneumatic control systems of the type adapted for use in automotive braking systems and the like; and to servo-motors and control valves used therein.

An object of the present invention is the provision of a new and improved pneumatic control system for automotive braking devices and the like of the type utilizing a motivating pressure fluid the intensity of which fluctuates, said system comprising: an auxiliary reservoir maintained by the system at the system's maximum energy level; and further comprising means for using the auxiliary reservoir to operate the controlled device when the energy level of the normal source of motivating fluid falls below a predetermined safe level.

A more specific object of the invention is the provision of a new and improved automotive braking system of the type which utilizes the vehicle's fluctuable manifold vacuum as a source of motivating power for the braking system; and which system is provided with an auxiliary reservoir separate and distinct from the normally used vacuum supply portion of the system and maintained at peak manifold vacuum by suitable valve means; said system further including means which automatically closes off the normally used vacuum supply portion of the system and at the same time makes available the auxiliary reservoir as the source of motivating vacuum, when the vacuum intensity in the normally used vacuum supply portion of the system is not sufficient to operate the brakes of the vehicle.

A further object of the invention is the provision of a new and improved automotive braking system of the above described type which will apply the brakes of the vehicle automatically by means of the auxiliary reservoir, when the energy level of the normally used pneumatic actuating system is no longer capable of adequately braking the vehicle.

Another object of the invention is the provision of a new and improved automotive braking system of the above described type in which the same brake applying control valve and control system is used to control the brakes in the emergency condition as is used normally; thereby eliminating duplicate sets of controls and avoiding loss in time required in shifting from one set of controls to the other set of controls during the emergency.

A still further object of the invention is the provision of a new and improved servo-motor control valve of the type adapted to regulate flow between a control chamber and two valve chambers adapted to be supplied with pressures of different intensities; said control valve also including means in the pneumatic supply system for one of said valve chambers which communicates a normal supply port to said one of said valve chambers when the pressure differential between said normal supply port and the other of said valve chambers exceeds a predetermined amount, and which communicates an auxiliary supply port with said one of said valve chambers when said differential pressure falls below said predetermined amount.

The invention resides in certain constructions and combinations and arrangement of parts, and further objects and advantages of the invention will be apparent to those skilled in the art to which the invention relates from the following description of the preferred embodiment described with reference to the accompanying drawings forming a part of this specification, and in which:

Figure 1 is a schematic view of a braking system on the tractor portion of a tractor trailer combination vehicle; and Figure 2 is a cross sectional view of a servo-motor shown in Figure 1.

The braking system of Figure 1 is known as a vacuum-over-hydraulic system in which manual braking effort is normally intensified by a fluid pressure servo-motor using manifold vacuum as a source of motivating power supply. The brakes of the tractor are controlled by, and during vacuum failure may be solely actuated by means of, a foot pedal lever operated master cylinder A the output pressure of which is communicated by means of line 10 to the hydraulic cylinder portion 12 of the servo-motor B. The hydraulic cylinder portion 12 is of the type which permits direct communication between its input line 10 and its output line 14 when the servo-motor B is not power actuated. Output line 14 is connected directly to the front and rear wheel cylinders C of the tractor to actuate the same. With reference to Figure 2, the servo-motor B is provided with a power cylinder 16 having a movable wall 18 therein dividing the cylinder 16 into opposed chambers 20 and 22; and the servo-motor B is also provided with a control valve D which normally energizes both chambers 20 and 22 with vacuum of equal intensity, and which actuates the servo-motor by admitting atmosphere to the rear opposed chamber 20. Vacuum to operate the fluid pressure motor B is normally supplied by the tractor engine manifold 24 through vacuum supply line 26, connecting with a vacuum supply reservoir 28; and thence through branch line 30 to the control valve D. A check valve 32 is provided in the supply line 26 to prevent pressure flow into the vacuum system from the manifold during periods of low manifold vacuum.

The braking system shown in the drawing is adapted to control the brakes of the trailer portion of the vehicle as well as those of the tractor. Vacuum for actuating the trailer's brakes is supplied by line 34 connecting the vacuum reservoir 28 to conventional valving, not shown, on the trailer. The valving in the trailer is controlled by means of the trailer control line 36, which line and valve are submerged with vacuum of an intensity equal to that in the trailer supply line 34 during the non-braking condition of the trailer's brakes; and which valve causes the brakes of the trailer to be applied when atmosphere is admitted to the control line 36. Control line 36 connects with the control valve D of the servo-motor such that both the tractor and the trailer brakes may be operated simultaneously. The trailer brakes may also be operated independently of the tractor's brakes by means of a hand control valve 40 supplied with vacuum from reservoir 28 through branch line 42, and which hand control valve 40 is adapted to regulate the pressure in the control line 36 through connection 44. For a more complete understanding of the construction and operation of the system so far described, reference may be had to the Earl R. Price Patent 2,719,609.

Referring now to Figure 2 of the drawing, the control valve D is shown integrally cast in the end closure member 46 of the servo-motor B. The hydraulic input signal from line 10 is communicated by passageway 48 to the rear side of a hydraulic piston 50 adapted to operate the control valve 52 for the servo-motor. The control valve 52 is provided with a vacuum chamber 54 positioned forwardly of the hydraulic piston 50. The control valve 52 is also provided with an atmospheric chamber 56 adjacent the forward end of the casting, and with a control chamber 58 positioned intermediate the vacuum and atmospheric chambers. An opening or valve port 60 is provided between the atmospheric and control chambers, and the vacuum and control chambers are separated by a diaphragm 62 likewise having an opening or valve port 64 therein to communicate the vacuum and control chambers. An annular plate 66 surrounds the opening 64 to form a valve seat, and a spider 68 adapted to be pushed by the hydraulic piston 50 is riveted to the diaphragm 62 and plate 66. Atmospheric pressure is communicated to the atmospheric chamber 56 through an air filter 70 and inlet line 72. A double poppet valve closure member 74 having poppets in both the control and atmospheric chambers is biased rearwardly by coil spring 76 to normally close off the atmospheric valve port 60. A coil spring 78 biases the diaphragm 62 rearwardly to normally provide communication between the vacuum and control chambers 54 and 58, respectively.

When the master cylinder A is operated by depressing the brake pedal lever L, hydraulic pressure in passageway 48 forces the hydraulic piston 50 forwardly to force the annular plate 66 against the valve closure member 74 to close off communication between the vacuum chamber 54 and control chamber 58. Thereafter continued forward movement of the piston 50 moves the other poppet of the valve closure member 74 out of engagement with its valve seat to dump air into the control chamber 58. Pressure build-up in the control chamber 58 is communicated to the back power chamber 20 of the servomotor through line 36 and branch line 80 to actuate the servomotor. Output pressure from the control valve 52 is at the same time communicated to the trailer through line 36 to apply the trailer's brakes simultaneously with those of the tractor.

It will be seen that the system so far described is incapable of power actuating the vehicle's brakes during periods of low vacuum in the vacuum reservoir 28. According to one of the provisions of the present invention, there is provided an auxiliary vacuum reservoir R for power actuating the brakes of the vehicle in an emergency when low vacuum exists in the normal supply reservoir 28. The reservoir R is supplied with vacuum from the normal vacuum supply reservoir 28 by means of line 82. A check valve 84 is positioned in the line 82 between the auxiliary reservoir R and the normal vacuum supply reservoir 28 to isolate the auxiliary reservoir R from the remainder of the vacuum supply system whenever the intensity of the vacuum in the normal supply system falls below that existing in the auxiliary reservoir R. By this expedient the auxiliary reservoir R is maintained at peak manifold vacuum at all times. In the embodiment shown, the auxiliary reservoir R is kept valved off from the remainder of the normal vacuum supply system until such time as the normal supply system is no longer capable of adequately braking the vehicle. Thereafter, the auxiliary reservoir R is automatically connected into the system in such manner as will permit at least one full and complete application of the vehicle's brakes capable of bringing the vehicle to an abrupt halt.

The specific embodiment of the invention shown in the drawing utilizes valve means 86 to regulate the vacuum supply to the servomotor's control valve 52 by automatically switching from the system's normal vacuum supply to the auxiliary reservoir when the normal vacuum supply is no longer capable of adequately braking the vehicle. By this expedient, a measure of control above and beyond the automatic actuation may be obtained by the normally used controls for the braking system. Valve structure 86 is shown as an integral part of the servomotor control valve D, and generally comprises four chambers positioned rearwardly of the hydraulic piston 50. The first of these chambers 88 is connected to the auxiliary reservoir R by means of line 90. The second most rearwardly positioned of these chambers 92 is connected to the vacuum chamber 54 of the control valve 52 by means of passageway 94. The third most rearwardly positioned chamber 96 is connected to the atmosphere by passageway 98; and the fourth or last chamber 100 is connected with the normal vacuum supply reservoir 28 through branch line 30. An opening or valve port 102 is provided between the first and second chambers 88 and 92, respectively, and a valve closure member 104, adapted to abut a valve seat surrounding the port 102, is positioned in the chamber 88. Valve closure member 104 is provided with a pin 106 which projects through a suitable sealed opening in the valve body into engagement with a hydraulic piston 50; and a suitable coil spring 108 biases the closure member 104 rearwardly against the seat to normally prevent communication between the chambers. Chambers 96 and 100 are separated by a movable diaphragm 110—which diaphragm carries a tubular member 112 which projects forwardly into close proximity to the valve closure member 104. A suitable stop 114 is positioned in chamber 100 to limit rearward movement of the diaphragm 110. A coil spring 116 biases the diaphragm 110 and tubular member 112 forwardly in the direction of valve closure member 104.

During normal operation of the braking system, sufficient vacuum exists in chamber 100 to hold the diaphragm 110 into engagement with stop 114. In this position, service vacuum from the reservoir 28 is communicated through tubular member 112 into chamber 92; and thence through passageway 94 to the vacuum chamber 54 of the control valve structure 52. Vacuum from chamber 54 is also communicated by means of passageway 118 to the front power chamber 22 of the servomotor. During the normal non-braking condition of the servomotor, diaphragm 62 is held rearwardly out of engagement with the valve closure member 74 such that vacuum from chamber 54 is also communicated with control chamber 58; and thence through lines 36 and 80 to the rear power chamber 20 of the servomotor.

When the service vacuum in chamber 100 decreases below a predetermined level, coil spring 116 biases the tubular member 112 forwardly into engagement with the valve closure member 104 closing off communication between chambers 100 and 92, respectively. Thereafter continued forward movement of the tubular member 112 forces the valve closure member 104 off of its seat to communicate auxiliary vacuum from the chamber 90 to the chamber 92. Auxiliary vacuum thereupon flows through passageway 94, chamber 54 and passageway 118 to the front opposed power chamber 22. At the same time auxiliary vacuum will also be communicated through normally open port 64 to control chamber 52, and thence through line 36 to the rear power chamber 20 as well as the trailer control line 36. This will in most cases provide a differential pressure between the trailer control and service lines 36 and 34, respectively to provide a partial application of the trailer's brakes. Continued forward movement of the tubular member 112 will, of course, cause the annular plate 66 to firmly abut the control valve closure member 74 and thereafter lift the valve closure member 74 off its valve seat to dump atmospheric pressure into the control chamber 58. This will, of course, communicate atmospheric pressure to the back power chamber 20 and trailer control line 36 to set the brakes of the tractor as well as those of the trailer.

If the loss of service vacuum in chamber 100 is not complete enough to completely overcome the reactive force of diaphragm 62 such that only a partial application of the vehicle brakes occurs, the operator may override the emergency application of the brakes by depressing the brake pedal L. This creates a hydraulic pressure in passageway 48 causing the hydraulic piston 50 to supplement the force being applied by the coil spring 116 to help force the valve closure member 74 out of engagement with the atmospheric valve seat. By applying enough force, the operator may, of course, hold the valve closure member 74 out of engagement with the atmospheric valve seat and immediately lock the vehicle brakes. Should the operator decide to reduce the amount of braking effort, he may do so by reducing pressure against the foot pedal lever, provided the differential pressure across diaphragm 110 is not sufficient by itself to overcome the reactive force of diaphragm 62. Reducing of the supplemental force exerted by hydraulic piston 50 may permit the valve closure member 74 to again close port 60 and open vacuum port 64 to bleed in vacuum to the control chamber 58 until the forces across diaphragm 62 again equal that supplied by the coil spring 116. This procedure will not, however, permit the operator to remove the emergency braking effort being produced as a result of the differential pressure across diaphragm 110.

If it should be desired to eliminate the portion of the automatic application which is above and beyond the control of the operator, pin 106 may be eliminated such that movement of the diaphragm 110 will not operate the control valve 52. With such an arrangement, valve structure 86 will merely communicate auxiliary vacuum to the vacuum chamber 54 of the control valve 52 such that a complete application of the vehicle brakes may be had the next time the operator depresses the foot pedal lever L. With such an arrangement it would be desirable to provide a warning device, such as a buzzer or the like, in the system to warn the operator that the next application of the brakes will be made with vacuum from the auxiliary reservoir R—such that the operator will not make several applications utilizing the vacuum in the auxiliary reservoir R, and thereby deplete the reservoir to the point where it will no longer provide a complete application of the vehicle's brakes.

While the preferred embodiment of the invention has been described in considerable detail, we do not wish to be limited to the particular constructions and arrangements shown which may be varied within the scope of the invention, and it is the intention to cover hereby all adaptations, modifications, and arrangements thereof which come within the practice of those skilled in the art to which the invention relates.

We claim:

1. In an automotive braking system and the like powered by a pressure differential: a fluid pressure motor having a power chamber therein, a movable wall dividing said power chamber into opposing chambers into which opposing chambers pressures of different intensities are admitted to actuate the movable wall, a generally constant source of pressure for communicating to one opposing chamber during actuation of the fluid pressure motor, a normally used but variable source of pressure of a different intensity from said generally constant source for communicating to the other opposing chamber during actuation of the movable wall, an auxiliary supply of pressure for communication with said other opposing chamber, a valve chamber to which said variable source of pressure and said auxiliary supply may be alternatively and individually communicated, a normally closed valve isolating said auxiliary supply from said valve chamber, a normally open valve communicating said variable source of pressure to said valve chamber, control valve means for controlling communication of said generally constant source of pressure and said valve chamber to said one opposing chamber, and means positively closing said normally open valve and thereafter opening said normally closed valve when the pressure differential between said variable and constant pressure sources decreases below a predetermined limit to thereafter make possible an emergency actuation of said fluid pressure motor.

2. In an automotive braking system and the like powered by pressure differential: a fluid pressure motor having a power chamber therein, a movable wall dividing said power chamber into opposing chambers into which opposing chambers pressures of different intensities are admitted to actuate the movable wall, a generally constant source of pressure for communicating to one opposing chamber during actuation of the fluid pressure motor, a normally used but variable source of pressure of a different intensity from said generally constant source for communicating to the other opposing chamber during actuation of the movable wall, an auxiliary supply of pressure for communication with said other opposing chamber, a valve chamber to which said variable source of pressure and said auxiliary supply may be alternatively and individually communicated, passage means continually communicating said valve chamber with said other opposing chamber, a normally closed valve isolating said auxiliary supply from said valve chamber, a normally open valve communicating said variable source of pressure to said valve chamber, a control valve means for controlling communication of said generally constant source of pressure and said valve chamber to said one opposing chamber, and means positively closing said normally open valve and thereafter opening said normally closed valve when the pressure differential between said variable and constant pressure sources decreases below a predetermined limit to thereafter make possible an emergency actuation of said fluid pressure motor.

3. In an automotive braking system and the like powered by pressure differential: a fluid pressure motor having a power chamber therein, a movable wall dividing said power chamber into opposing chambers into which opposing chambers pressures of different intensities are admitted to actuate the movable wall, a generally constant source of pressure for communicating to one opposing chamber during actuation of the fluid pressure motor, a normally used but variable source of pressure of a different intensity from said generally constant source for communicating to the other opposing chamber during actuation of the movable wall, an auxiliary supply of pressure for communication with said other opposing chamber, a valve chamber to which said variable source of pressure and said auxiliary supply may be alternatively and individually communicated, a normally closed valve isolating said auxiliary supply from said valve chamber, a normally open valve communicating said variable source of pressure to said valve chamber, control valve means for controlling communication of said generally constant source of pressure and said valve chamber to said one opposing chamber, and means positively closing said normally open valve and thereafter opening said normally closed valve when the pressure differential between said variable and constant pressure sources decreases below a predetermined limit, said last mentioned means also operating said control valve means to automatically actuate said fluid pressure motor.

4. In an automotive braking system and the like powered by pressure differential: a fluid pressure motor having a power chamber therein, a movable wall dividing said power chamber into opposing chambers into which opposing chambers pressures of different intensities are admitted to actuate the movable wall, a generally constant source of pressure for communicating to one opposing chamber during actuation of the fluid pressure motor, a normally used but variable source of pressure of a different intensity from said generally constant source for communicating to the other opposing chamber during actuation of the movable wall, an auxiliary supply of pressure for communication with said other opposing chamber, means for normally actuating said fluid pressure motor by communicating said generally constant source of pressure to said one opposing chamber while communicating said variable source of pressure to said other opposing chamber, means which when in one position causes said first mentioned means to be operative to actuate said movable wall and which when in a second position communicates said auxiliary supply of pressure to said other opposing chamber while said generally constant source of pressure is communicated to said one opposing chamber, and means causing said second mentioned means to be moved into its second position when the pressure differential between the pressures of said generally constant source and said variable source falls below a predetermined amount.

References Cited in the file of this patent

UNITED STATES PATENTS

| | | | |
|---|---|---|---|
| 1,403,290 | Catching | Jan. 10, | 1922 |
| 2,095,833 | Rockwell | Oct. 12, | 1937 |
| 2,345,213 | O'Shei | Mar. 28, | 1944 |
| 2,705,870 | Holton | Apr. 12, | 1955 |
| 2,719,609 | Price | Oct. 4, | 1955 |
| 2,768,640 | Zimmer et al. | Oct. 30, | 1956 |
| 2,775,980 | Renaudie | Jan. 1, | 1957 |